United States Patent
Takenouchi et al.

(10) Patent No.: US 11,718,894 B2
(45) Date of Patent: *Aug. 8, 2023

(54) METHOD FOR SEPARATING COPPER, AND NICKEL AND COBALT

(71) Applicant: SUMITOMO METAL MINING CO., LTD., Tokyo (JP)

(72) Inventors: Hiroshi Takenouchi, Niihama (JP); Hiroshi Kobayashi, Niihama (JP); Hirofumi Shoji, Niihama (JP); Tatsuya Higaki, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 507 days.

This patent is subject to a terminal disclaimer.

(21) Appl. No.: 16/771,419

(22) PCT Filed: Nov. 28, 2018

(86) PCT No.: PCT/JP2018/043846
§ 371 (c)(1),
(2) Date: Jun. 10, 2020

(87) PCT Pub. No.: WO2019/124015
PCT Pub. Date: Jun. 27, 2019

(65) Prior Publication Data
US 2021/0180154 A1    Jun. 17, 2021

(30) Foreign Application Priority Data
Dec. 18, 2017   (JP) ................ 2017-242225

(51) Int. Cl.
*C22B 15/00* (2006.01)
*C22B 3/08* (2006.01)
(Continued)

(52) U.S. Cl.
CPC ............ *C22B 15/0071* (2013.01); *C22B 3/08* (2013.01); *C22B 3/44* (2013.01); *C22B 7/003* (2013.01);
(Continued)

(58) Field of Classification Search
CPC ................................................ C22B 7/007
See application file for complete search history.

(56) References Cited

U.S. PATENT DOCUMENTS 3,793,429 A    2/1974  Queneau et al.
3,975,189 A    8/1976  Haugen
(Continued)

FOREIGN PATENT DOCUMENTS

CA    1327452 C    3/1994
CA    2360608 A1   5/2002
(Continued)

OTHER PUBLICATIONS

Espacenet machine translation of JP-2007323868-A retrieved on Oct. 9, 2022 (Year: 2007).*

(Continued)

*Primary Examiner* — Jophy S. Koshy
*Assistant Examiner* — Joshua S Carpenter
(74) *Attorney, Agent, or Firm* — Locke Lord LLP; James E. Armstrong, IV; Nicholas J. DiCeglie, Jr.

(57) ABSTRACT

Provided is a method for separating copper from nickel and cobalt, which can efficiently and selectively separate copper from nickel and cobalt in a substance containing copper, nickel, and cobalt in a waste lithium ion battery, etc. In this method, a substance containing copper, nickel, and cobalt is sulfurated to obtain a sulfide, the obtained sulfide that contains copper, nickel, and cobalt is brought into contact with an acid solution to obtain a solid containing copper and a leachate containing nickel and cobalt. The sulfide prefer- (Continued)

ably contains copper sulfide as a main component, and contains nickel metal and cobalt metal. In-addition, when bringing the sulfide into contact with the acid solution, the added amounts of the sulfide and the acid solution are preferably adjusted such that the oxidation-reduction potential of the obtained leachate is maintained at 150 mV or less where a silver/silver chloride electrode is a reference electrode.

5 Claims, 1 Drawing Sheet

(51) Int. Cl.
    *C22B 3/44*     (2006.01)
    *C22B 7/00*     (2006.01)
    *C22B 3/00*     (2006.01)

(52) U.S. Cl.
    CPC ........ *C22B 15/0056* (2013.01); *C22B 23/043* (2013.01)

(56) References Cited

U.S. PATENT DOCUMENTS

| | | | |
|---|---|---|---|
| 4,401,630 | A | 8/1983 | Ettell et al. |
| 6,440,194 | B1 | 8/2002 | Krofchak et al. |
| 2003/0066389 | A1 | 4/2003 | Kudo et al. |
| 2013/0269484 | A1 | 10/2013 | Ishida et al. |
| 2013/0287621 | A1 | 10/2013 | Fujita et al. |
| 2014/0174256 | A1 | 6/2014 | Takahashi et al. |
| 2014/0322109 | A1 | 10/2014 | Nakai et al. |

FOREIGN PATENT DOCUMENTS

| | | | | |
|---|---|---|---|---|
| CA | 2481729 | A1 | | 3/2005 |
| CN | 1115338 | A | | 1/1996 |
| CN | 1172167 | A | | 2/1998 |
| CN | 101285127 | A | | 10/2008 |
| CN | 101298638 | A | | 11/2008 |
| CN | 101555556 | A | | 10/2009 |
| CN | 104911359 | A | | 9/2015 |
| CN | 105063349 | A | | 11/2015 |
| CN | 106505272 | A | | 3/2017 |
| CN | 107779595 | A | | 3/2018 |
| EP | 0248518 | A1 | | 12/1987 |
| EP | 3690068 | A1 | | 8/2020 |
| JP | 57-131332 | A | | 8/1982 |
| JP | S63-259033 | A | | 10/1988 |
| JP | H02-197533 | A | | 8/1990 |
| JP | H09-082371 | A | | 3/1997 |
| JP | 2003-082421 | A | | 3/2003 |
| JP | 2005-089808 | A | | 4/2005 |
| JP | 2007-191769 | A | | 8/2007 |
| JP | 2007-323868 | A | | 12/2007 |
| JP | 2007323868 | A | * | 12/2007 |
| JP | 2009-097076 | A | | 5/2009 |
| JP | 2009097076 | A | * | 5/2009 |
| JP | 2010-100938 | A | | 5/2010 |
| JP | 2010-277868 | A | | 12/2010 |
| JP | 2012-138301 | A | | 7/2012 |
| JP | 2012-172169 | A | | 9/2012 |
| JP | 2015-183292 | A | | 10/2015 |
| JP | 2016-102251 | A | | 6/2016 |
| JP | 2017-036489 | A | | 2/2017 |
| JP | 2017-155280 | A | | 9/2017 |
| JP | 2017-155280 | A | | 9/2017 |
| JP | 2018-040035 | A | | 3/2018 |
| WO | 2012/102384 | A1 | | 8/2012 |
| WO | 13/077296 | A1 | | 5/2013 |

OTHER PUBLICATIONS

Espacenet machine translation of JP-2009097076-A retrieved on Oct. 9, 2022 (Year: 2009).*

International Search Report dated Jan. 29, 2019, issued for PCT/JP2018/043846.
Office Action issued in the U.S. Appl. No. 16/641,669, dated Mar. 10, 2022.
Physics, Chemistry, Liao Hept, Liao ning Person Press, p. 165, Nov. 1987, see the nature of sulphur (2 pages) See the machine translation of the Office Action issued for CN 201880056786.5 dated Aug. 30, 2021 as a concise explanation of the relevance.
Office Action issued in the related CN Patent Application No. 201880056786.5, dated Aug. 30, 2021.
Friedrich Bernd et al. "Status and Trends of industrialized Li-Ion battery recycling processes with qualitative comparison of economic and environmental impacts", Sep. 21, 2017, pp. 1-19.
J. Kang et al. "Preparation of cobalt oxide from concentrated cathode material of spent lithium ion batteries by hydrometallurgical method", Advanced Powder Technology, Elsevier BV, NL, vol. 21, No. 2, Mar. 1, 2010, pp. 175-179.
Extended European Search Report issued in the EP Patent Application No. 18860201.5, dated Apr. 22, 2021.
Office Action issued in the CA Patent Application No. 3077604, dated May 11, 2021.
Office Action issued in the CA Patent Application No. 3072317, dated May 12, 2021.
A. A. Palant et al., "Leaching Kinetics of the Magnetic Fraction of Converter Matte in Sulfuric Acid and Hydrochloric Acid Solutions",Russian Metallurgy, vol. 2010, No. 12, Dec. 31, 2010, pp. 1110-1113.
F. Huang et al., "Selective recovery of valuable metals from nickel converter slag at elevated temperature with sulfuric acid solution", Separation and Purification Technology, vol. 156, Oct. 23, 2015, pp. 572-581.
Extended European Search Report issued in the EP Patent Application No. 18870066.0, dated Jun. 10, 2021.
Y. Xie Y et al., "Recovery of nickel, copper and cobalt from low-grade Ni-Cu sulfide tailings", Hydrometallurgy, Elsevier Scientific Publishing CY. Amsterdam, NL, vol. 80, No. 1-2, Nov. 1, 2005, pp. 54-58.
Extended European Search Report issued in the EP Patent Application No. 18871166.7, dated Jun. 10, 2021.
International Search Report including Written Opinion issued in the International Application No. PCT/JP2018/033682 dated Nov. 20, 2018.
Office Action issued in the KR Patent Application No. KR10-2020-7006158, dated Jun. 19, 2020.
Office Action issued in the CN Patent Application No. CN201880056267.9, dated Jul. 21, 2020.
Buschow, K.H. et al. Encyclopedia of Materials—Science and Technology, vols. 1-11—Hydrometallurgical Principles, Elsevier, p. 3970-3988 (2001), (Year:2001).
D. Dreisinger, "Copper leaching from primary sulfides: Options for biological and chemical extraction of copper," Hydrometallurgy 83, 2006, pp. 10-20.
Office Action issued in the U.S. Appl. No. 16/648,480, dated Jun. 26, 2020.
Office Action issued in the U.S. Appl. No. 16/648,480, dated Nov. 12, 2020.
International Search Report including Written Opinion issued in the International Application No. PCT/JP2018/033683 dated Nov. 6, 2018.
International Search Report including Written Opinion issued in the International Application No. PCT/JP2018/030801 dated Oct. 30, 2018.
Stefanova Vladislava et al: "Copper, Nickel and Cobalt Extraction from FeCuNiCoMn Alloy Obtained after Pyrometallurgical Processing of Deep Sea Nodules", Proceedings of the Tenth (2013) ISOPE Ocean Mining and Gas Hydrates Symposium, Sep. 22, 2013, pp. 180-184.
International Search Report issued in PCT/JP2019/024805, dated Jul. 30, 2019.

* cited by examiner

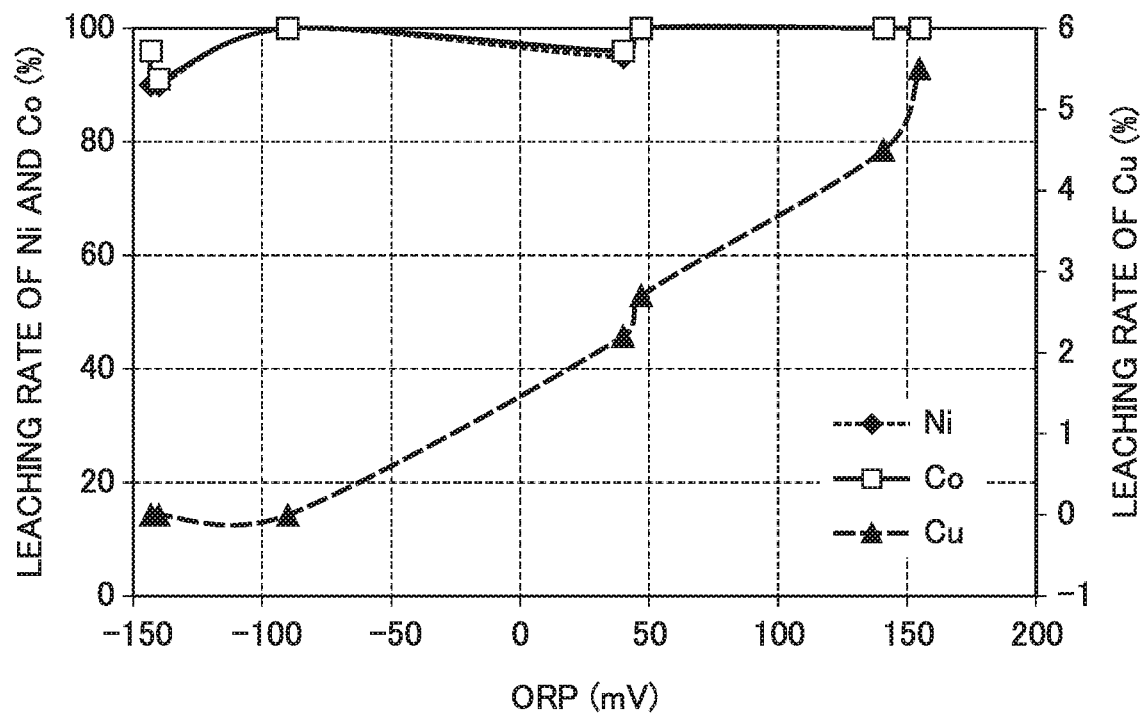

METHOD FOR SEPARATING COPPER, AND NICKEL AND COBALT

TECHNICAL FIELD

The present invention relates to a method for separating copper, and nickel and cobalt, from a sulfide containing a copper sulfide as a main component and containing copper, nickel, and cobalt.

BACKGROUND ART

A lithium ion battery (hereinafter, also referred to as "LIB") having light weight and high output is mounted on a vehicle such as an electric car or a hybrid car and an electronic device such as a mobile phone, a smart phone, or a personal computer.

The LIB has a structure in which an outer can formed of a metal such as aluminum or iron or plastic such as vinyl chloride is electric charged with a negative electrode material in which a negative electrode active material such as graphite is firmly fixed onto a surface by using a copper foil in a negative electrode collector, and a positive electrode material in which a positive electrode active material such as lithium nickelate or lithium cobaltate is firmly fixed onto a positive electrode collector formed of an aluminum foil, along with a separator formed of a porous resin film of polypropylene or the like, and an organic solvent containing an electrolyte such as lithium hexafluorsophosphate ($LiPF_6$) is impregnated as an electrolytic solution.

In a case where the LIB is used by being built in the vehicle, the electronic device, or the like described above, eventually, the LIB is not capable of being used due to the deterioration of the car, the electronic device, or the like, the lifetime of the LIB, or the like, and thus, becomes a waste lithium ion battery (a waste LIB). In addition, the waste LIB may occur as a defective product in a manufacturing process from the beginning.

In such a waste LIB, valuable components such as nickel, cobalt, and copper are contained, and it has been desirable to recover and reuse these valuable components in order for effective utilization of resources.

Generally, in the case of efficiently recovering the valuable component from a device or a member made of metal, or a material, a dry treatment using a dry smelting technology in which the device, the member, or the material is put into a furnace or the like and are fused at a high temperature, and is separated into a metal that is a valuable resource and a slag to be subjected to disposal is considered as a quick method.

For example, in Patent Document 1, a method of recovering a valuable metal by using the dry treatment is disclosed. By applying such a method disclosed in Patent Document 1 to the recovering of a valuable metal from the waste LIB, it is possible to obtain a copper alloy containing nickel and cobalt.

Such a dry treatment has a problem in that energy for heating to a high temperature is required, but has an advantage in that various impurities can be treated in a simple process, and the impurities can be separated all at once. In addition, the slag to be obtained also has advantage in that the slag has chemically comparatively stable properties, and thus, there is no concern that an environmental problem occurs, and the slag is easily subjected to disposal.

However, there is a problem in that, in a case where the waste LIB is treated in the dry treatment, a part of the valuable component, in particular, most of cobalt is distributed to the slag, and thus, it is inevitable that a recovery loss of cobalt occurs. In addition, a metal that is obtained in the dry treatment is an alloy containing the coexisting valuable components, and in order for reuse, it is necessary to perform a purification treatment in which each component is separated from the alloy, and impurities are removed.

Examples of an element separating method that has been generally used in the dry method include a method of performing slow cooling from a fused state at a high temperature, and thus, for example, of separating copper and lead from each other or separating lead and zinc from each other. However, in a case where copper and nickel are main components, as with the waste LIB, copper and nickel have properties of being homogeneously melted in the entire composition range, and thus, even in the case of performing slow cooling, copper and nickel are only mixed and solidified into layers, but are not capable of being separated effectively.

Further, there is also a purification method in which nickel is subjected to a disproportionation reaction by using carbon monoxide (CO) gas, and is volatilized, and thus, is separated from copper or cobalt, but very toxic CO gas is used, and thus, it is difficult to ensure safety.

In addition, examples of a method for separating copper and nickel from each other that has been industrially performed include a method of roughly separating a mixed mat (a sulfide). In such a method, a mat containing copper and nickel is produced in a smelting process, and as with the case described above, is slowly cooled, and thus, is separated into a sulfide rich in copper and a sulfide rich in nickel. However, even in such a method, copper and nickel are only roughly separated from each other, and thus, in order to obtain nickel or copper having a high purity, a treatment such as separate electrolytic purification is required.

A method of using a vapor pressure difference through chloride has been also considered as the other method, but the method is a process of handling a large amount of toxic chlorine, and thus, it is difficult to say that the method is industrially suitable for device corrosion countermeasures, safety countermeasures, or the like.

Further, the same applies to the separation between copper and cobalt and the separation between cobalt and nickel.

As described above, the separation and the purification of each element in the dry method has disadvantages of remaining at a rough separation level or requiring a high cost, compared to a wet method.

On the other hand, a hydrometallurgical method using an acid or a treatment such as a neutralizing treatment or a solvent extraction treatment has advantages of requiring low energy consumption, and individually separating mixed valuable components and thus directly recovering them in a grade of a high purity.

However, in the case of treating the waste LIB by using the wet treatment, a hexafluorophosphate anion of an electrolytic solution component contained in the waste LIB is a difficult-to-treat material that is not capable of being completely decomposed even at a high temperature and a high sulfuric acid concentration, and is mixed into an acid solution in which a valuable component is leached. Further, the hexafluorophosphate anion is dissolved in water-soluble carbonate ester, and thus, it is difficult to recover phosphorus or fluorine from an aqueous solution after the valuable resource is recovered, so that it is necessary to take various measures for suppressing release to a public sea area or the like.

In addition, it is not easy to obtain a solution that can be used for efficiently leaching and purifying the valuable component from the waste LIB with only an acid. It is difficult to leach the waste LIB itself, and the valuable component cannot be leached at a sufficient leaching rate. Further, in the case of forcibly performing leaching, for example, by using an acid having strong oxidation power, a large amount of components that are not recovery targets, such as aluminum, iron, or manganese, are also leached along with the valuable components, and thus a problem arises in that an addition amount of a neutralizing agent for treating the components by neutralization or the like or a water drainage amount to be handled increases.

Further, in a case where the pH of a liquid is adjusted in order to pass through separating means such as solvent extraction or ion exchange from an acidic leachate, or the impurities are neutralized and fixed to a precipitate, a generation amount of a neutralized precipitate also increases, and thus, there are many problems from the viewpoint of ensuring a treatment place and ensuring stability.

Further, an electric charge may remain in the waste LIB, and in a case where the treatment is performed in such a state, there is a concern that exotherm, explosion, or the like is caused, and thus, for example, a complicated treatment such as immersion in saline water for discharge is also required.

As described above, it is not possible to say that a method of treating the waste LIB by using only the wet treatment is an advantageous method.

Therefore, an attempt has been made in which the waste LIB that is difficult to be treated by only the dry treatment or the wet treatment described above, is treated by a method in which the dry treatment and the wet treatment are combined, that is, the impurities are maximally removed by the dry treatment such as roasting the waste LIB to obtain a homogeneous treated material of the waste LIB, and the treated material thus obtained is subjected to the wet treatment to be separated into the valuable component and the other components.

In such a method in which the dry treatment and the wet treatment are combined, fluorine or phosphorus in the electrolytic solution is removed by being volatilized in the dry treatment, and plastics that are structural parts of the waste LIB or members of an organic material such as a separator are decomposed. However, in the case of performing the dry treatment, the recovery loss due to the distribution of cobalt contained in the waste LIB to the slag still remains as a problem.

A method is also considered in which an atmosphere, a temperature, a reduction degree, or the like in the dry treatment is adjusted, and thus, cobalt is distributed as a metal, and is reduced and melted to decrease the distribution to the slag. However, the metal obtained by such a method forms a poorly-soluble corrosion-resistant alloy based on copper, containing nickel and cobalt, and even in the case of dissolving the alloy with an acid in order to separate and recover the valuable component, a problem arises in that it is difficult to dissolve the alloy.

In addition, for example, in the case of performing acid dissolution with respect to the corrosion-resistant alloy by using chlorine gas, a lysate (a leachate) to be obtained contains copper at a high concentration and nickel or cobalt at a comparatively low concentration. Among them, although nickel and cobalt can be easily separated by using a known method such as solvent extraction, it is difficult to separate a large amount of copper from nickel or cobalt easily and at a low cost.

As described above, it has been difficult to efficiently separate only copper, nickel, and cobalt from the waste LIB containing various components in addition to copper, nickel, or cobalt that is the valuable component. Note that, the problems described above also occur in the case of separating copper, nickel, and cobalt from the waste battery containing copper, nickel, and cobalt other than the waste LIB, and also occur in the case of separating copper, nickel, and cobalt from an alloy containing copper, nickel, and cobalt derived from the waste battery.

Patent Document 1: Japanese Unexamined Patent Application, Publication No. 2012-172169
Patent Document 2: Japanese Unexamined Patent Application, Publication No. S63-259033

DISCLOSURE OF THE INVENTION

Problems to be Solved by the Invention

The present invention has been made in consideration of such circumstances, and an object thereof is to provide a method for separating copper from nickel and cobalt, which can efficiently and selectively separate copper from nickel and cobalt, from the material containing copper, nickel, and cobalt such as a waste lithium ion battery.

Means for Solving the Problems

The present inventor has conducted intensive studies in order to attain the object described above. As a result thereof, it has been found that, by sulfurizing a material containing copper, nickel, and cobalt such as a waste lithium ion battery to obtain a sulfide and bringing the sulfide into contact with an acid solution, copper can be separated and precipitated as a solid copper sulfide, while nickel and cobalt can be leached in the acid solution, thereby completing the present invention. That is, the present invention provides the followings.

(1) A first invention of the present invention is a method for separating copper from nickel and cobalt, the method including: sulfurizing a material containing copper, nickel, and cobalt to obtain a sulfide; and bringing the obtained sulfide containing copper, nickel, and cobalt into contact with an acid solution to obtain a solid containing copper and a leachate containing nickel and cobalt.

(2) A second invention of the present invention is the method for separating copper from nickel and cobalt according to the first invention, in which the sulfide contains a copper sulfide as a main component and contains a nickel metal and a cobalt metal.

(3) A third invention of the present invention is the method for separating copper from nickel and cobalt according to the first or second invention, in which when the sulfide is brought into contact with the acid solution, addition amounts of the sulfide and the acid solution are adjusted such that an oxidation-reduction potential of the obtained leachate is maintained at 150 mV or less in terms of a value obtained where a silver/silver chloride electrode is a reference electrode.

(4) A fourth invention of the present invention is the method for separating copper from nickel and cobalt according to any one of the first to third inventions, in which the acid solution is a solution containing one or more types selected from sulfuric acid, hydrochloric acid, and nitric acid.

(5) A fifth invention of the present invention is the method for separating copper from nickel and cobalt according to any one of the first to fourth inventions, in which the material containing copper, nickel, and cobalt is a material that is obtained by heating and melting, and reducing scrap of a lithium ion battery.

(6) A sixth invention of the present invention is the method for separating copper from nickel and cobalt according to any one of the first to fifth inventions, in which the sulfide has a powder form having a particle diameter of 300 μm or less.

(7) A seventh invention of the present invention is the method for separating copper from nickel and cobalt according to any one of the first to sixth inventions, in which after the solid containing copper and the leachate containing nickel and cobalt are separated, a treatment of removing copper remaining in the leachate is performed.

(8) An eighth invention of the present invention is the method for separating copper from nickel and cobalt according to the seventh invention, in which copper remaining in the leachate is removed by one or more types of methods selected from a sulfurizing treatment, an electrowinning treatment, and a neutralizing and precipitating treatment.

Effects of the Invention

According to the present invention, it is possible to efficiently and selectively separate copper from nickel and cobalt, from the material containing copper, nickel, and cobalt such as a waste lithium ion battery.

Then, nickel and cobalt that are separated from copper can be separated by a known method such as solvent extraction, and can be respectively effectively reused as a metal or salts of a high purity. In addition, the separated copper is in the form of a solid copper sulfide that is suitable for copper smelting, and is directly put into a converter of a copper smelting furnace and is subjected to electrolytic purification or the like, and thus the separated copper can be recovered as copper of a high purity.

BRIEF DESCRIPTION OF THE DRAWINGS

FIG. 1 is a graph illustrating a relationship of leaching rates of Ni, Co, and Cu with respect to an oxidation-reduction potential of a leachate.

PREFERRED MODE FOR CARRYING OUT THE INVENTION

Hereinafter, specific embodiments of the present invention (hereinafter, referred to as "this embodiment") will be described in detail. Note that, the present invention is not limited to the following embodiments, and various modifications are possible without changing the gist of the present invention. In addition, in the present specification, "X to Y" (X and Y are arbitrary numerical values) means "X or more and Y or less".

A method for separating copper from nickel and cobalt according to this embodiment (hereinafter, simply referred to as a "separating method") is a method for separating copper from nickel and cobalt, from a material containing copper, nickel, and cobalt.

Specifically, in this separating method, a material containing copper, nickel, and cobalt is sulfurized to obtain a sulfide, and the obtained sulfide that contains copper, nickel, and cobalt is brought into contact with an acid solution to obtain a solid containing copper and a leachate containing nickel and cobalt.

Herein, examples of the material containing copper, nickel, and cobalt that is a treatment target of the separating method include a waste battery such as a scrap of a lithium ion battery that is generated in accordance with disposal due to the deterioration of a car, an electronic device, or the like, or the lifetime of the lithium ion battery (hereinafter, also referred to as a "waste lithium ion battery"). The separating method according to this embodiment is a method of efficiently and selectively separating copper, nickel, and cobalt, which are valuable metals, into copper, and nickel and cobalt from such a waste lithium ion battery.

Note that, the meaning of the waste battery (waste lithium ion battery) in the present specification includes not only a battery that has been used but also a defective product or the like in a manufacturing process. In addition, it is sufficient that the waste battery is included, and the fact that metals or resins other than the configuration of the waste battery are included is not excluded. In this case, the waste battery including these metals or resins is regarded as the waste battery.

[Production of Sulfide]

In the separating method according to this embodiment, first, a material containing copper, nickel, and cobalt is sulfurized to obtain a sulfide. Specifically, for example, in a case where a waste lithium ion battery is regarded as a treatment target, by subjecting the waste lithium ion battery to a dry treatment in which heating and melting, and reducing are performed, an alloy containing copper, nickel, and cobalt is obtained, this alloy is sulfurized using a sulfurizing agent, and thus a sulfide containing copper, nickel, and cobalt can be obtained.

Note that, an alloy production treatment of obtaining an alloy containing copper, nickel, and cobalt from a waste lithium ion battery, can be performed, for example, by first performing such a treatment that a waste lithium ion battery is introduced into a roasting furnace and roasted at a temperature of about 300° C. to 1000° C. is performed, and then performing such a treatment that the roasted material (roasted product) thus obtained is introduced into a melting furnace such as a crucible made of graphite or a crucible made of magnesium and melted at a high temperature of about 1100° C. to 1400° C. The alloy obtained in this way becomes a material containing copper, nickel, and cobalt that is a target to be sulfurized.

Upon sulfurizing the material containing copper, nickel, and cobalt, sulfurizing conditions are not particularly limited, but regarding a sulfide to be produced, at least a copper component may be contained in the form of a copper sulfide, and it is not necessary that nickel and cobalt are in the form of a sulfide. Instead, if all of nickel and cobalt are contained in the form of a sulfide, the leaching rates of nickel and cobalt are decreased in the subsequent treatment; meanwhile, copper is leached, etc., and thus selectivity may be decreased.

As described above, preferably, a sulfide containing copper, nickel, and cobalt in which only a copper component is contained in the form of a sulfide is produced. That is, a sulfide containing a copper sulfide as a main component and containing a nickel metal and a cobalt metal is produced. Note that, in the present specification, cases where most of copper is in the form of a sulfide, and nickel and cobalt, and some of copper coexist in the form of a metal or the form partially containing oxygen or the like are also collectively referred to as a "sulfide". In addition, the main component indicates that the corresponding component is contained in an amount of more than 50 mass %.

Herein, in order to produce a sulfide in which only copper becomes a sulfide and nickel and cobalt exist as metal, by controlling the addition amount of the sulfurizing agent or the pressure conditions to adjust the degree of sulfurization, a partial sulfurization reaction in which only copper is sulfurized is caused.

A sulfide containing a copper sulfide as a main component and containing a nickel metal and a cobalt metal is a so-called partial sulfide as described above, but by the sulfide being in the form of such a partial sulfide, a difference in degree of solubility of copper, nickel, and cobalt contained in the sulfide is generated, leaching is performed with an acid by the next treatment, and thus it is considered that copper becomes a residue as a copper sulfide and nickel and cobalt can be selectively leached.

The sulfurizing agent used in sulfurization is not particularly limited, and a liquid sulfurizing agent or a gas sulfurizing agent such as sodium hydrogen sulfide (sodium hydride sulfide), sodium sulfide, and hydrogen sulfide gas can be used. In addition, the use amount (addition amount) of the sulfurizing agent in sulfurization is preferably 1 equivalent or more as determined by a reaction formula $Cu+S \rightarrow CuS$ with respect to the amount of copper contained in the material containing copper, nickel, and cobalt. Note that, as described above, it is preferable that the addition amount of the sulfurizing agent is appropriately adjusted in order to cause a partial sulfurization reaction in which only copper becomes a sulfide.

The shape of the sulfide is not particularly limited, but a sulfide obtained by sulfurization can be formed as a plate-shaped sulfide, for example, by casting the sulfide into a plate shape. In addition, a sulfide obtained by sulfurization can also be formed as a rod sulfide by linearly drawing out and appropriately cutting the sulfide.

Further, an atomization method is applied to the molten metal of the sulfide obtained by sulfurization, and thus a powder sulfide can also be obtained. Hereinafter, this sulfide powder is also conveniently referred to as an "atomized powder". Note that, the atomization method is a method in which the molten metal is scattered and cooled rapidly (coagulated) by bringing the molten metal into contact with gas or water of a high pressure to obtain a powder.

In the case of forming a sulfide into a powder shape, the particle diameter of the sulfide is preferably approximately 300 μm or less. By using a powder-shaped sulfide having a particle diameter of 300 μm or less, the sulfide is easily treated in the next contact with an acid solution, which is preferable. Note that, when the particle diameter is excessively small, since it takes cost for powderization and dust or ignition is caused, the particle diameter of the sulfide is preferably approximately 10 μm or more.

[Contact with Acid Solution]

In the separating method according to this embodiment, next, the sulfide obtained as described above is brought into contact with an acid solution. Accordingly, while copper is precipitated, etc. as a solid copper sulfide so as to be separated from the sulfide which has been brought into contact with the acid solution, nickel and cobalt are leached with this acid solution to obtain a leachate.

As described above, by bringing the obtained sulfide into contact with an acid solution, it is possible to efficiently and selectively separate copper from nickel and cobalt. That is, since copper remains as a sulfide (copper sulfide), it is possible for copper to hardly exist in the leachate; meanwhile, it is possible for nickel and cobalt to exist in an acidic solution (the leachate) at an extremely high ratio.

This is considered to be caused by sulfurizing a material containing copper, nickel, and cobalt, particularly, forming the material in the form of a sulfide containing a copper sulfide as a main component and containing a nickel metal and a cobalt metal by partial sulfurization, and bringing the sulfide into contact with an acid solution. In the sulfide containing a copper sulfide as a main component, as described above, a difference in degree of solubility of copper, nickel, and cobalt with respect to the acid solution is generated. Therefore, while the sulfide is brought into contact with the acid solution and subjected to a reaction, and thus copper is directly separated as a copper sulfide and separated from the original sulfide by being precipitated, etc. on the bath bottom of a reaction bath due to a difference in specific gravity, nickel and cobalt are selected and leached by an acid on the basis of the following Reaction Formulas (1) and (2) so as to exist as ions in the leachate. Note that, even if some of nickel and cobalt are in the form of a sulfide, due to the presence of an acid, the sulfides of nickel and cobalt are decomposed on the basis of the following Reaction Formulas (1)' and (2)' so as to exist in a state of ions in the leachate.

(Reaction Formulas)

$$Ni+H_2SO_4 \rightarrow NiSO_4+H_2 \tag{1}$$

$$NiS+2H_2SO_4 \rightarrow NiSO_4+H_2S \tag{1'}$$

$$Co+2HCl \rightarrow CoCl_2+H_2 \tag{2}$$

$$CoS+2HCl \rightarrow CoCl_2+H_2S \tag{2'}$$

As the acid solution, a solution containing any one type of hydrochloric acid, nitric acid, and sulfuric acid or a solution obtained by mixing two or more types thereof can be used. However, in the case of using a waste lithium ion battery as a treatment target, from the viewpoint of so-called "battery-to-battery" that nickel and cobalt are recovered from the inside of the waste lithium ion battery and a lithium ion battery is reproduced, it is desirable that sulfuric acid is used as an acid solution and nickel is obtained as a sulfate that is in the form of a raw material for a positive electrode material of a lithium ion battery.

Further, in the case of using sulfuric acid as an acid solution, hydrochloric acid having a lower concentration than the concentration of sulfuric acid or a chloride that does not affect the subsequent nickel and cobalt separating step may be added.

Furthermore, when a sulfide is brought into contact with an acid solution, an oxidizing agent such as oxygen, air, or hydrogen peroxide may be added. According to this, leaching of nickel and cobalt is accelerated, which is preferable.

Incidentally, in the separating method according to this embodiment, a method in which copper remains as a residue in the form of copper sulfide and nickel and cobalt are leached in a solution and separated is considered to be established by using a difference in degree of solubility of copper, nickel, cobalt, and the sulfide thereof as described above. Further, it is preferable in terms of the industrial aspect that the leaching rate of copper is suppressed to 5% or less. At this time, it is preferable that in the operating management, management is performed by using an oxidation-reduction potential of a leachate to be obtained.

Specifically, it is preferable that the leaching state is determined by measuring an oxidation-reduction potential (ORP, reference electrode: silver/silver chloride electrode) of a leachate obtained by bringing the sulfide into contact with the acid solution, and the addition amount of the sulfide or the addition amount of the acid solution is adjusted such that the ORP is maintained in a range of 150 mV or less. Note that, it is preferable that, at the end of the leaching, the leaching is finished such that the ORP is in a negative region.

Note that, as described above, the addition amount of the acid solution is preferably adjusted depending on the leaching state based on the ORP of the leachate, but in the case of using a solution of hydrochloric acid or sulfuric acid as an acid solution, regarding the amount of the acid in the acid solution with which the sulfide is brought into contact, for example, with respect to the total amount of nickel and cobalt contained in the sulfide, the amount of the acid that is obtained by the above Reaction Formulas (1), (2), and the like is 1 equivalent or mote, preferably 1.2 equivalents or more, and more preferably 1.2 equivalents or more and 11 equivalents or less. Note that, the reaction rate can be increased by increasing the acid concentration.

In addition, the concentration of a slurry obtained by adding the acid solution to the sulfide, that is, a ratio of the mass of the sulfide to the volume of the slurry (the mass of the sulfide containing copper, nickel, and cobalt/the volume of the slurry) is preferably 20 g/L or more.

The reaction temperature (the liquid temperature when nickel and cobalt are leached with an acid solution) is not particularly limited, but from the viewpoint of obtaining a certain degree of the leaching rate, the reaction temperature is, for example, 50° C. or higher and preferably 75° C. or higher. In addition, the reaction temperature is more preferably 95° C. or higher, and when the reaction temperature is 95° C. or higher, for example, as compared to the reaction at lower than 75° C., the reaction rate can be remarkably increased and leaching can be performed at a preferred leaching rate. Note that, the liquid temperature is preferably maintained almost constant during the reaction.

In addition, the reaction time is not particularly limited, and can be set, for example, to about 1 to 6 hours.

The method of bringing the sulfide into contact with an acid solution is not particularly limited, and for example, mixing is performed by adding the sulfide into the acid solution, etc., and stirring may be performed as necessary.

Herein, with the separating method according to this embodiment, it is efficiently and selectively separate copper from nickel and cobalt, but it is also considered that some of copper is leached from the sulfide and copper remains in the leachate. In a case where some of copper remains in the leachate in this way, if the copper is directly discharged from a leaching facility or the like, a load to a treatment of separating nickel and cobalt is increased, which is not preferable. Therefore, it is desirable that the copper is separated and removed from the leachate in which some of copper remains in advance.

In this regard, in this embodiment, it is preferable that a copper removal facility is provided in the form of being continued to a reaction bath in which copper is separated from nickel and cobalt, a leachate discharged from an outlet of the reaction bath is transferred to the copper removal facility, and copper remaining in the leachate is completely removed.

A copper removing treatment performed in a copper removal facility is not particularly limited, and examples thereof include a sulfurizing treatment of sulfurizing copper by adding a sulfurizing agent, an electrowinning treatment of precipitating copper in a leachate on an electrode by electrolysis using a leachate as an electrolytic solution, and a neutralizing treatment of producing a neutralized precipitate of copper by adding a neutralizing agent into a leachate.

In this way, the leachate obtained by providing a copper removal facility and completely removing copper is transferred to the process of separating nickel and cobalt. According to this, nickel and cobalt not containing copper as an impurity and having a high purity can be purified, respectively.

As described above, in the separating method according to this embodiment, a material containing copper, nickel, and cobalt such as a waste lithium ion battery is sulfurized to obtain a sulfide, the obtained sulfide that contains copper, nickel, and cobalt is then brought into contact with an acid solution to obtain a solid containing copper and a leachate containing nickel and cobalt. According to such a method, among valuable metals contained in a treatment target of a waste lithium ion battery or the like, copper can be precipitated and separated as a copper sulfide; meanwhile, nickel and cobalt can be efficiently and selectively separated as a leachate.

Note that, the copper sulfide obtained by the separating method is directly supplied, for example, as a raw material of a known copper smelting process, and thus, it is possible to obtain an anode, and to obtain copper of a high purity by performing electrolytic purification with respect to the anode.

In addition, nickel and cobalt leached in the leachate are supplied, for example, to a known nickel smelting process, and thus it is possible to obtain a nickel metal or a cobalt metal by separating nickel and cobalt with purification means such as solvent extraction, followed by electrowinning. Further, it is also possible to purify nickel and cobalt as a nickel salt or a cobalt salt to be recycled as a raw material of the lithium ion battery again.

EXAMPLES

Hereinafter, the present invention will be described in more detail by means of Examples, but the present invention is not limited to the following Examples at all.

Example 1

First, a waste lithium ion battery (waste LIB) was subjected to a dry treatment in which heating and melting, and reducing were performed and then sulfurized by adding a sulfurizing agent, thereby obtaining a molten metal of a sulfide containing copper, nickel, and cobalt. Note that, the amount of the sulfurizing agent, that is, sulfur added at the time of sulfurization was set to an equivalent corresponding to the equivalent for forming copper contained in the waste LIB into a copper sulfide.

Next, the molten metal of the sulfide thus obtained flowed into a small crucible having a hole in a bottom surface, gas or water of a high pressure was sprayed to the molten metal flowing out of the hole, and the molten metal was scattered and coagulated, thereby obtaining an atomized powder (an atomized powder of the sulfide). Then, the obtained atomized powder was sieved with a sieve having an opening of 300 μm, thereby obtaining a sulfide powder having a particle diameter of 300 μm or less. In the following Table 1, the results obtained by analyzing the obtained sulfide powder by using an ICP analysis device are shown.

TABLE 1

| (Mass %) | Cu | Ni | Co | S |
|---|---|---|---|---|
| Sulfide | 64 | 8 | 8 | 20 |

The sulfide powder obtained in this way was crushed and pulverized by using a known method and 1.0 g of the sulfide powder was sampled.

Next, sulfuric acid was prepared in an amount that was 1.5 equivalents to 2.2 equivalents of the sulfuric acid amount necessary for leaching nickel and cobalt in the sulfide as a sulfate, and the liquid amount was adjusted to 50 ml. Then, the liquid temperature of the sulfuric acid solution was maintained at 95° C., and the acid solution was mixed with the sulfide under the conditions shown in the following Table 2 and reacted for 3 hours to perform a leaching treatment. Note that, the leaching treatment was performed under stirring with a stirrer, but air or the like was not particularly blown.

The solid-liquid separation was performed at the end of the leaching, and the oxidation-reduction potential (ORP) of the obtained leachate was measured using a silver/silver chloride electrode as a reference electrode. In addition, the concentrations of copper, nickel, and cobalt in the leachate were analyzed by using ICP to obtain leaching rates. Note that, the leaching rate was calculated from a proportion of the original amount of the material being leached in the leachate. In the following Table 2, the leaching conditions and the leaching rates are shown. In addition, in FIG. 1, a relationship of the leaching rates of copper, nickel, and cobalt with respect to the ORP of the leachate was graphically shown.

TABLE 2

| Acid equivalent | Time (h) | ORP (mV) | Leaching rate (%) | | |
|---|---|---|---|---|---|
| | | | Ni | Co | Cu |
| 2 | 3 | −140 | 90 | 91 | 0.0 |
| 2 | 6 | −90 | 100 | 100 | 0.0 |
| 1.5 | 6 | −143 | 90 | 96 | 0.0 |
| 1.7 | 6 | 47 | 100 | 100 | 2.7 |
| 1.7 | 6.5 | 141 | 100 | 1000 | 4.5 |
| 2.2 | 3 | 40 | 95 | 96 | 2.2 |
| 2.2 | 5.5 | 155 | 100 | 100 | 5.5 |

As shown in Table 2, it was found that, while nickel and cobalt are dissolved in the leachate at a high leaching rate of 90% or more, the leaching rate of copper is less than 6% at most and copper remains as a solid (leaching residue) without being dissolved in the leachate. That is, it was confirmed that it is possible to separate copper as a leaching residue and to selectively leach nickel and cobalt in the acid solution and separate copper from nickel and cobalt.

In addition, from Table 2 and FIG. 1, it is found that, in a case where the ORP at the end of the leaching shows a negative potential, copper is not leached at all. From this point, it is found that, by adjusting the addition amount of the sulfide powder or the addition amount of the acid solution to have an ORP of 0 mV or less, selectivity can be further enhanced by sufficiently suppressing the leaching of copper while leaching nickel and cobalt.

Comparative Example 1

A waste lithium ion battery was subjected to a dry treatment in which heating and melting, and reducing were performed similarly to Example 1, but, thereafter, sulfurization was not performed, thereby obtaining an alloy with the composition shown in the following Table 3 containing copper as a main component and containing nickel and cobalt. Then, the obtained alloy was finely-grained by the same method as in Example 1, thereby obtaining an atomized powder.

TABLE 3

| (Mass %) | Cu | Ni | Co | S |
|---|---|---|---|---|
| Alloy | 76 | 12 | 12 | <0.1 |

Next, 1 g of the obtained atomized powder was sampled, sulfuric acid was prepared in an amount that was 2 equivalents with respect to nickel and cobalt in the alloy, and the liquid amount was adjusted to 50 ml. Then, the liquid temperature of the sulfuric acid solution was maintained at 95° C., and the acid solution was mixed with the alloy and reacted for 3 hours to perform a leaching treatment. Note that, in the leaching treatment, stirring was performed with a stirrer, but air or the like was not particularly blown.

As a result, all of the leaching rates of copper, nickel, and cobalt were 0.1% or less, and copper, nickel, and cobalt could not be almost leached.

Reference Example

Similarly to Example 1, a waste lithium ion battery was subjected to a dry treatment in which heating and melting, and reducing were performed and then sulfurized by adding a sulfurizing agent to obtain a molten metal of a sulfide containing copper, nickel, and cobalt, thereby obtaining an atomized powder having the composition shown in the following Table 4. However, in sulfurization, sulfur was excessively added, nickel and cobalt as well as copper were sulfurized until the form of NiS or CoS was obtained.

TABLE 4

| (Mass %) | Cu | Ni | Co | S |
|---|---|---|---|---|
| Sulfide | 50 | 8 | 8 | 34 |

Next, the obtained sulfide powder was crushed and pulverized, 1.0 g of the sulfide powder was sampled, sulfuric acid was prepared in an amount that was 2 equivalents of the sulfuric acid amount necessary for forming nickel and cobalt in the sulfide into a sulfuric acid compound, and the liquid amount was adjusted to 50 ml. Then, the liquid temperature of the sulfuric acid solution was maintained at 95° C., and the acid solution was mixed with the sulfide and reacted for 3 hours to perform a leaching treatment. Note that, the leaching treatment was performed under stirring with a stirrer, but air or the like was not particularly blown.

As a result, when the leachate after the reaction was analyzed, the leaching rates of copper, nickel, and cobalt were 18%, 10%, and 10%, respectively, which means that it was possible to leach more nickel and cobalt as compared to Comparative Example. However, the leaching of copper was also increased, and the selectivity of the leaching of nickel and cobalt was remarkably decreased as compared to Example.

From this point, it was confirmed that, by causing a partial sulfurization reaction such that copper is formed into a sulfide and the total amount of nickel and cobalt does not become a sulfide, nickel and cobalt can be selectively leached and effectively separated from copper remaining as a leaching residue.

The invention claimed is:

1. A method for separating copper from nickel and cobalt, the method comprising:
   sulfurizing a material containing copper, nickel, and cobalt to obtain a sulfide-containing copper sulfide as a main component and also containing nickel metal and cobalt metal;
   bringing the obtained sulfide into contact with an acid solution, which is a solution containing at least one selected from the group consisting of sulfuric acid, hydrochloric acid and nitric acid, to obtain a solid containing copper sulfide and a leachate containing nickel and cobalt; and
   wherein when the sulfide is brought into contact with the acid solution, adjusting addition amounts of the sulfide and the acid solution, such that an oxidation-reduction potential of the obtained leachate is maintained at a value of 150 mV or less where a silver/silver chloride electrode is a reference electrode.

2. The method for separating copper from nickel and cobalt according to claim 1, wherein the material containing copper, nickel, and cobalt is obtained by heating, melting, and reducing a waste lithium ion battery.

3. The method for separating copper from nickel and cobalt according to claim 1, wherein the sulfide has a powder form having a particle diameter of 300 µm or less.

4. The method for separating copper from nickel and cobalt according to claim 1, wherein after the solid containing copper sulfide and the leachate containing nickel and cobalt are separated, a treatment of removing copper remaining in the leachate is performed.

5. The method for separating copper from nickel and cobalt according to claim 4, wherein copper remaining in the leachate is removed by one or more types of methods selected from a sulfurizing treatment, an electrowinning treatment, and a neutralizing and precipitating treatment.

* * * * *